(12) United States Patent
Iyer et al.

(10) Patent No.: US 11,606,399 B2
(45) Date of Patent: Mar. 14, 2023

(54) SYSTEM AND METHOD FOR MEETING PREPARATION AND USER CONTENT MANAGEMENT USING HETEROGENEOUS CLOUD SERVICE PROVIDERS

(71) Applicant: Dell Products L.P., Hopkinton, MA (US)

(72) Inventors: Vivek Viswanathan Iyer, Austin, TX (US); Benedict Tiong Chee Tay, Singapore (SG); Loo Shing Tan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/154,386

(22) Filed: Jan. 21, 2021

(65) Prior Publication Data

US 2022/0232054 A1 Jul. 21, 2022

(51) Int. Cl.
| | |
|---|---|
| *H04L 65/403* | (2022.01) |
| *H04L 51/00* | (2022.01) |
| *H04L 67/10* | (2022.01) |
| *H04L 12/18* | (2006.01) |

(52) U.S. Cl.
CPC ........ *H04L 65/403* (2013.01); *H04L 12/1818* (2013.01); *H04L 12/1822* (2013.01); *H04L 12/1831* (2013.01); *H04L 51/00* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,214,748 B2 * | 7/2012 | Srikanth | G06Q 10/109 709/204 |
| 8,533,226 B1 * | 9/2013 | Fox | G06F 16/951 707/783 |
| 9,461,834 B2 * | 10/2016 | Ferlitsch | G06Q 10/109 |
| 9,661,065 B2 * | 5/2017 | Doshi | H04L 67/1001 |
| 9,824,333 B2 * | 11/2017 | Shaw | G06Q 10/109 |
| 9,824,335 B1 * | 11/2017 | Vander Mey | G06Q 10/103 |
| 9,870,554 B1 * | 1/2018 | Leung | G06F 16/24575 |
| 9,883,003 B2 * | 1/2018 | Stott | H04L 67/5682 |
| 10,102,764 B1 * | 10/2018 | Berk | G09B 5/12 |
| 10,164,984 B2 * | 12/2018 | Kim | G06F 21/6272 |
| 10,389,769 B2 * | 8/2019 | Gudipaty | G06F 3/0482 |
| 10,484,452 B2 * | 11/2019 | Reyes | H04M 7/0027 |
| 10,979,598 B2 * | 4/2021 | Tsukamoto | H04N 1/00217 |

(Continued)

*Primary Examiner* — Backhean Tiv
(74) *Attorney, Agent, or Firm* — Chamberlain, Hrdlicka, White, Williams & Aughtry

(57) ABSTRACT

A method for managing cloud service providers (CSPs) includes obtaining, by a CSP management service, CSP user information corresponding to a plurality of users, initiating access to user content in at least a CSP of the CSPs using the CSP user information, after obtaining the CSP user information: obtaining, from a meeting preparation service, a content provide request, wherein the content provide request corresponds to a meeting, in response to the content provide request: obtaining access links to each data object of the user content that corresponds to the meeting, and providing dashboard-ready information to the meeting preparation service, wherein the dashboard-ready information comprises the access links.

7 Claims, 9 Drawing Sheets

(56) References Cited

U.S. PATENT DOCUMENTS

| | | | |
|---|---|---|---|
| 11,095,468 B1* | 8/2021 | Pandey | G06F 16/345 |
| 11,368,538 B2* | 6/2022 | Oh | G06F 3/0486 |
| 2003/0080986 A1* | 5/2003 | Baird | G06F 16/9562 |
| | | | 715/700 |
| 2004/0059785 A1* | 3/2004 | Blume | G06Q 10/109 |
| | | | 709/204 |
| 2006/0026502 A1* | 2/2006 | Dutta | G06F 40/166 |
| | | | 715/201 |
| 2007/0253424 A1* | 11/2007 | Herat | H04L 12/1818 |
| | | | 370/395.2 |
| 2008/0005233 A1* | 1/2008 | Cai | G06F 16/4393 |
| | | | 709/204 |
| 2009/0019526 A1* | 1/2009 | Fukushima | H04L 12/1822 |
| | | | 726/3 |
| 2009/0327019 A1* | 12/2009 | Addae | G06Q 10/109 |
| | | | 705/7.18 |
| 2010/0235216 A1* | 9/2010 | Hehmeyer | G06Q 10/06316 |
| | | | 705/7.26 |
| 2011/0264745 A1* | 10/2011 | Ferlitsch | G06Q 10/109 |
| | | | 709/204 |
| 2011/0270922 A1* | 11/2011 | Jones | G06F 3/0488 |
| | | | 709/204 |
| 2014/0150059 A1* | 5/2014 | Uchida | G06F 16/90 |
| | | | 707/661 |
| 2016/0112476 A1* | 4/2016 | Gudipaty | G06Q 10/10 |
| | | | 715/753 |
| 2016/0134839 A1* | 5/2016 | Inomata | H04L 65/403 |
| | | | 348/14.09 |
| 2016/0373516 A1* | 12/2016 | Reyes | G06F 3/1423 |
| 2017/0208212 A1* | 7/2017 | Tsukamoto | H04L 12/1818 |
| 2019/0386839 A1* | 12/2019 | Kosugi | H04L 12/1831 |
| 2020/0372140 A1* | 11/2020 | Jaber | H04L 12/1822 |
| 2022/0014582 A1* | 1/2022 | Brodkowitz | H04L 67/14 |
| 2022/0086238 A1* | 3/2022 | Oh | H04L 67/142 |
| 2022/0232054 A1* | 7/2022 | Iyer | H04L 67/10 |

* cited by examiner

SYSTEM AND METHOD FOR MEETING PREPARATION AND USER CONTENT MANAGEMENT USING HETEROGENEOUS CLOUD SERVICE PROVIDERS

BACKGROUND

Computing devices in a cloud service provider may include any number of hardware resources such as processors, memory, and persistent storage. Each cloud service provider may operate independently of each other. The use of multiple cloud service providers may require either integration or awareness of the user content by users storing the user content in the multiple cloud service providers.

SUMMARY

In general, in one aspect, the invention relates to a method for managing cloud service providers (CSPs). The method includes obtaining, by a CSP management service, CSP user information corresponding to a plurality of users, initiating access to user content in at least a CSP of the CSPs using the CSP user information, after obtaining the CSP user information: obtaining, from a meeting preparation service, a content provide request, wherein the content provide request corresponds to a meeting, in response to the content provide request: obtaining access links to each data object of the user content that corresponds to the meeting, and providing dashboard-ready information to the meeting preparation service, wherein the dashboard-ready information comprises the access links.

In general, in one aspect, the invention relates to non-transitory computer readable medium comprising computer readable program code, which when executed by a computer processor enables the computer processor to perform a method for managing CSPs. The method includes obtaining, by a CSP management service, CSP user information corresponding to a plurality of users, initiating access to user content in at least a CSP of the CSPs using the CSP user information, after obtaining the CSP user information: obtaining, from a meeting preparation service, a content provide request, wherein the content provide request corresponds to a meeting, in response to the content provide request: obtaining access links to each data object of the user content that corresponds to the meeting, and providing dashboard-ready information to the meeting preparation service, wherein the dashboard-ready information comprises the access links.

In general, in one aspect, the invention relates to a system that includes a processor ant memory that includes instructions which, when executed by the processor, performs a method. The method includes obtaining, by a CSP management service, CSP user information corresponding to a plurality of users, initiating access to user content in at least a CSP of the CSPs using the CSP user information, after obtaining the CSP user information: obtaining, from a meeting preparation service, a content provide request, wherein the content provide request corresponds to a meeting, in response to the content provide request: obtaining access links to each data object of the user content that corresponds to the meeting, and providing dashboard-ready information to the meeting preparation service, wherein the dashboard-ready information comprises the access links.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing use of heterogeneous cloud service providers (CSPs) for a set of users. The CSPs may provide services such as, for example, storing user content, providing meeting collaboration services for the set of users. Embodiments of the invention may relate to utilizing a CSP management service that manages the user content in the CSPs by providing dashboard-ready information associated with the meetings to the set of users. The dashboard-ready information may be links to the user content that is associated with the meeting. The dashboard-ready information may be organized into folders based on the meetings. The storage, deletion, and/or updates may be managed based on meeting policies corresponding to the meeting.

The CSP management service may further perform synchronization of the user content between multiple CSPs. In this manner, as user content in one CSP is updated, a second user may access the updated user content in a second CSP.

Figure 1:
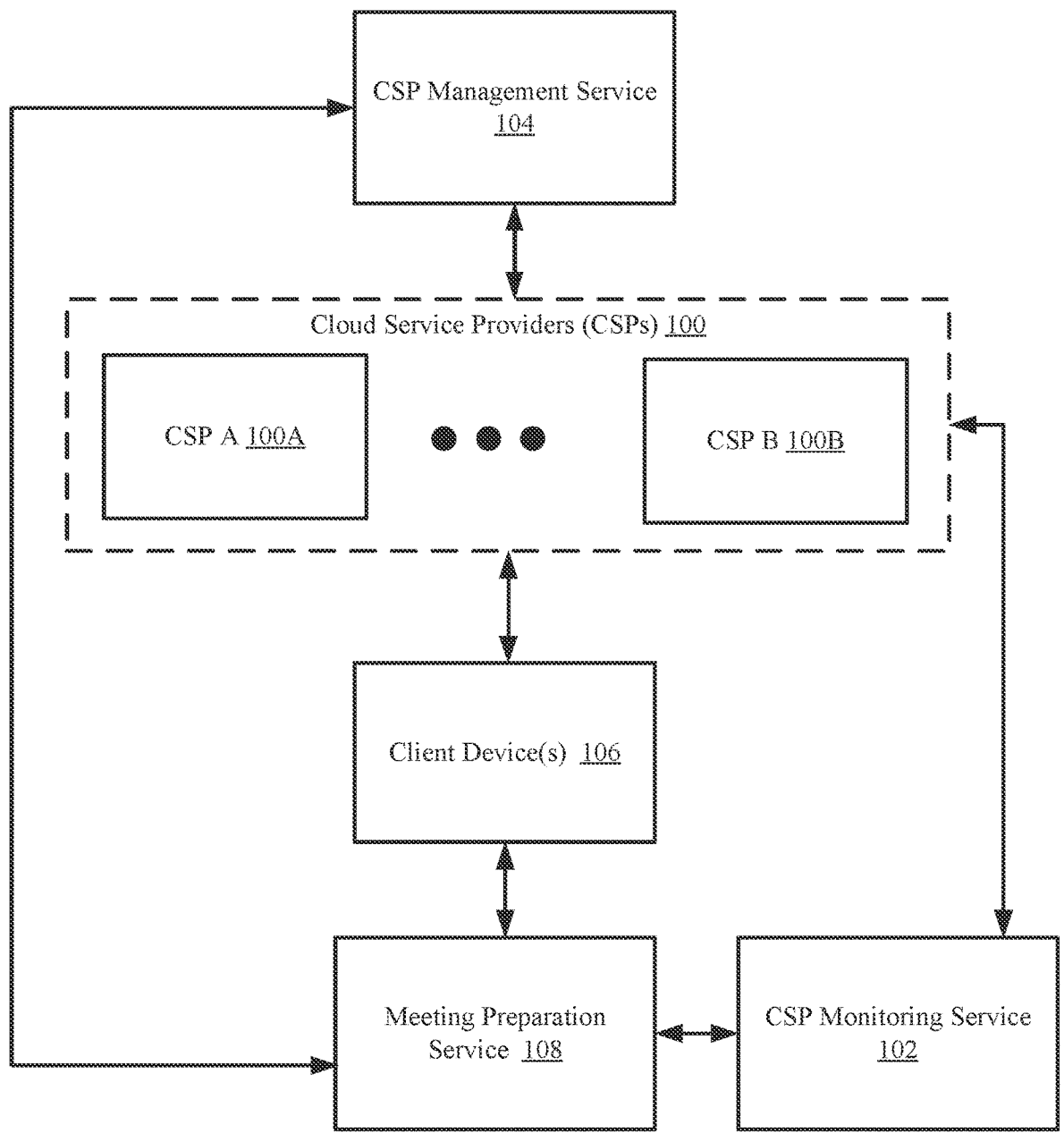
FIG. 1 shows a diagram of a system in accordance with one or more embodiments of the invention.

FIG. 1 shows a diagram of a system in accordance with one or more embodiments of the invention. The system includes CSPs (100), a CSP management service (104), a meeting preparation service (108), a CSP monitoring service (102), and one or more client devices (106). The system may include additional, fewer, and/or different components. Each of the aforementioned components illustrated in FIG. 1 is discussed below.

In one or more embodiments of the invention, the CSPs (100) are each independent entities that provide cloud services to the client devices (106). The cloud services provided by the CSPs (100) may include, but are not limited to, storing data corresponding to the client devices (106), initiating and executing meeting collaboration tools (discussed below), and/or executing any other applications on behalf of the client devices (106). While a limited set of cloud services are discussed for the CSPs (100), any other cloud services may be performed by the CSPs (100) without departing from the invention.

In one or more embodiments of the invention, at least one CSP (100A, 100B) executes a meeting collaboration tool. In one or more embodiments of the invention, a meeting collaboration tool is an application that enables users operating the client devices (106) to execute virtual meetings. The execution of virtual meetings may include, for example, scheduling time periods in which the meetings are to be performed, providing sessions that reserve one or more computing devices for the meeting, and/or providing additional services (e.g., text chat between user, video chat between the users, calling, etc.).

In one or more embodiments of the invention, the CSPs (e.g., 100A, 100B) are heterogeneous entities that each operate independently from the other CSPs (100A, 100B) in the system. For example, each CSP (100A, 100B) may be owned by a different owner. Further, the operation of one CSP (100A, 100B) should not directly impact the operation of a second CSP. However, the data stored in each CSP (100A, 100B) in the system may trigger a synchronization to the data in the rest of the CSPs (100A, 100B) performed via the CSP management service (104) (discussed below).

In one or more embodiments of the invention, each CSP (100A, 100B) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the CSP (100A, 100B) described throughout this application.

In one or more embodiments of the invention, each CSP (100A, 100B) is implemented as a logical device. The logical device may utilize the computing resources of any number of computing devices and thereby provide the functionality of the CSP (100A, 100B) described throughout this application.

In one or more embodiments of the invention, the CSP management service (104) includes functionality for managing the data in the CSPs (100) for the client devices (106). The data managed by the CSP management service (104) may be user content corresponding to users operating the client devices (106). The user content may be generated, deleted, updated, and/or otherwise updated by the CSP management service (104) on behalf of the users.

For example, the user content may be managed by generating folders for each CSP (100A, 100B) that includes data objects associated with a meeting. The user content may be synchronized between the various CSPs (100) aiding with the meeting. The CSP management service (104) may further include functionality for managing the access to the user content in each folder for each user associated with the meeting. The access may include permissions provided to each user. Examples of permissions include, but are not limited to, permission to read a data object, permission to write to a data object, and permission to generate a new data object. Each user may have various permissions for each data object in the folder.

Figure 2A:
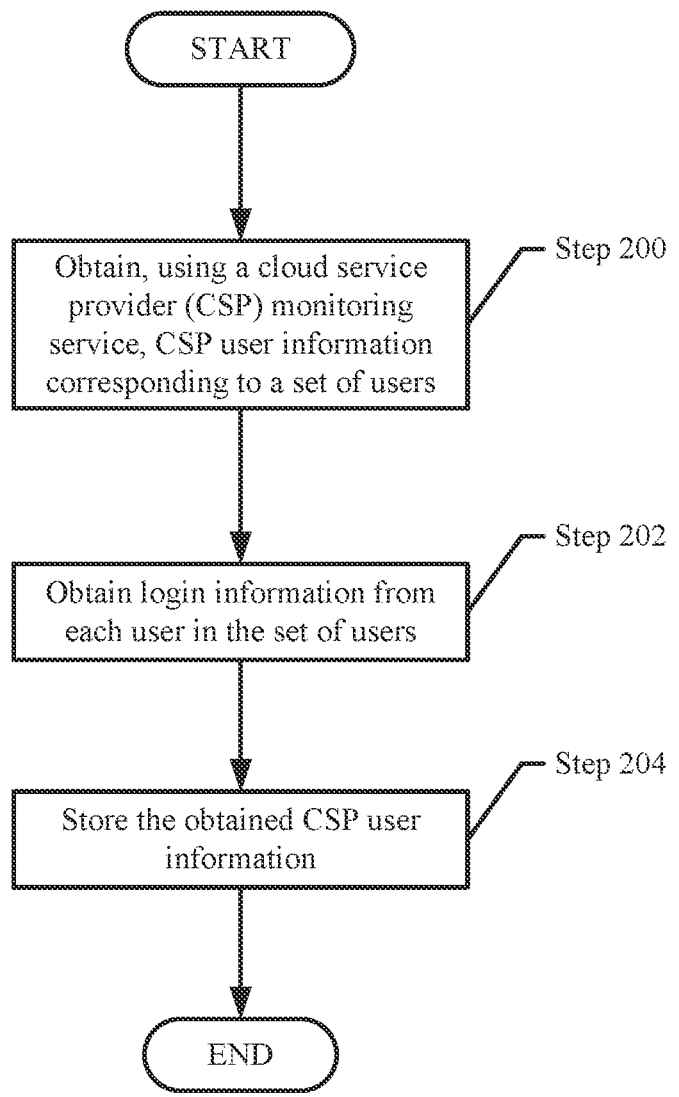
FIG. 2A shows a flowchart for obtaining CSP user meeting information in accordance with one or more embodiments of the invention.
Figure 2B:
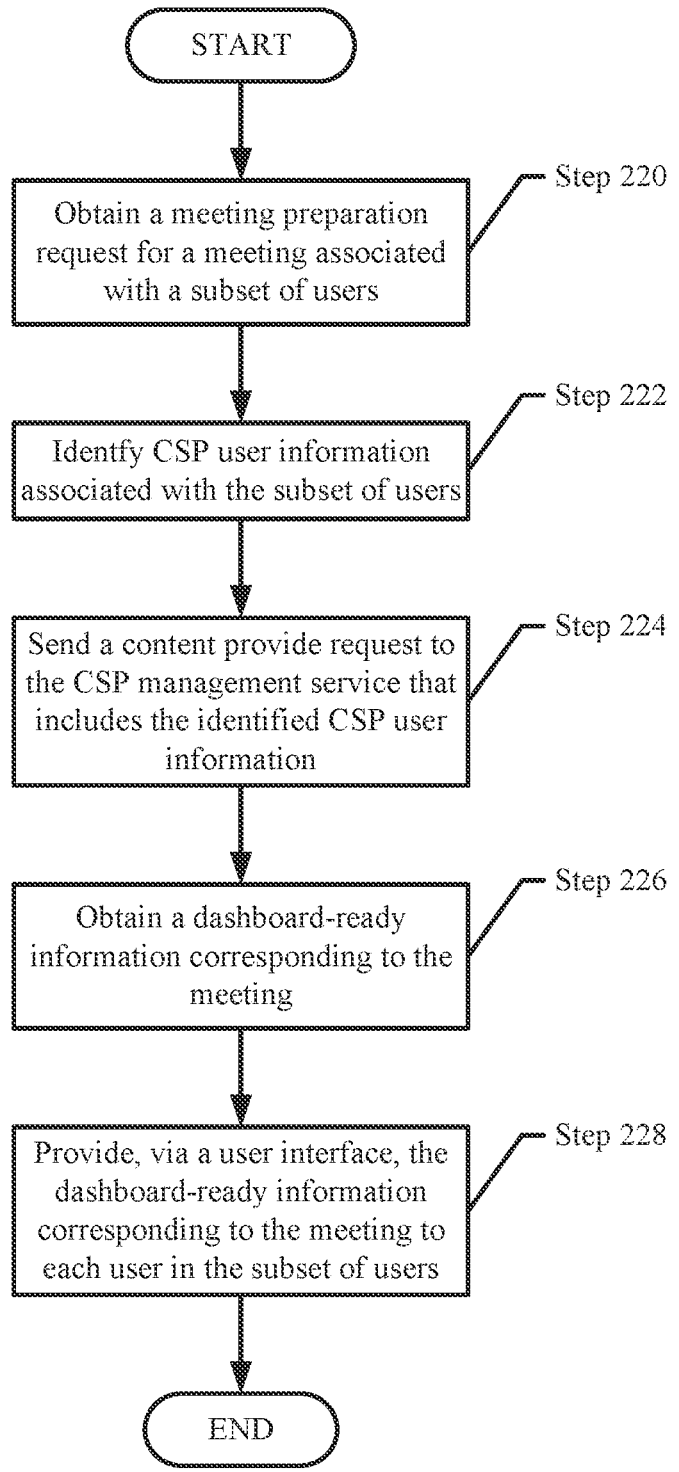
FIG. 2B shows a flowchart for preparing dashboard-ready information to be provided to a subset of users in accordance with one or more embodiments of the invention.
Figure 2C:
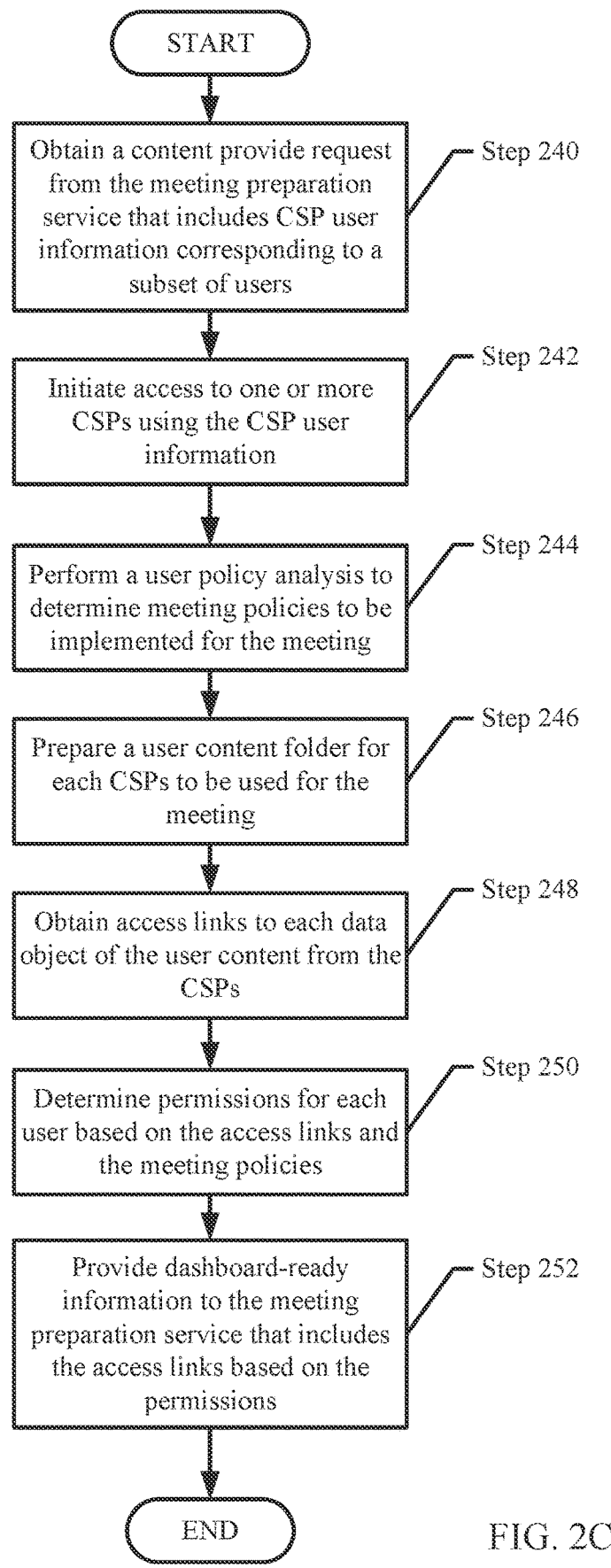
FIG. 2C shows a flowchart for managing user content in cloud service providers (CSPs) in accordance with one or more embodiments of the invention.
Figure 2D:
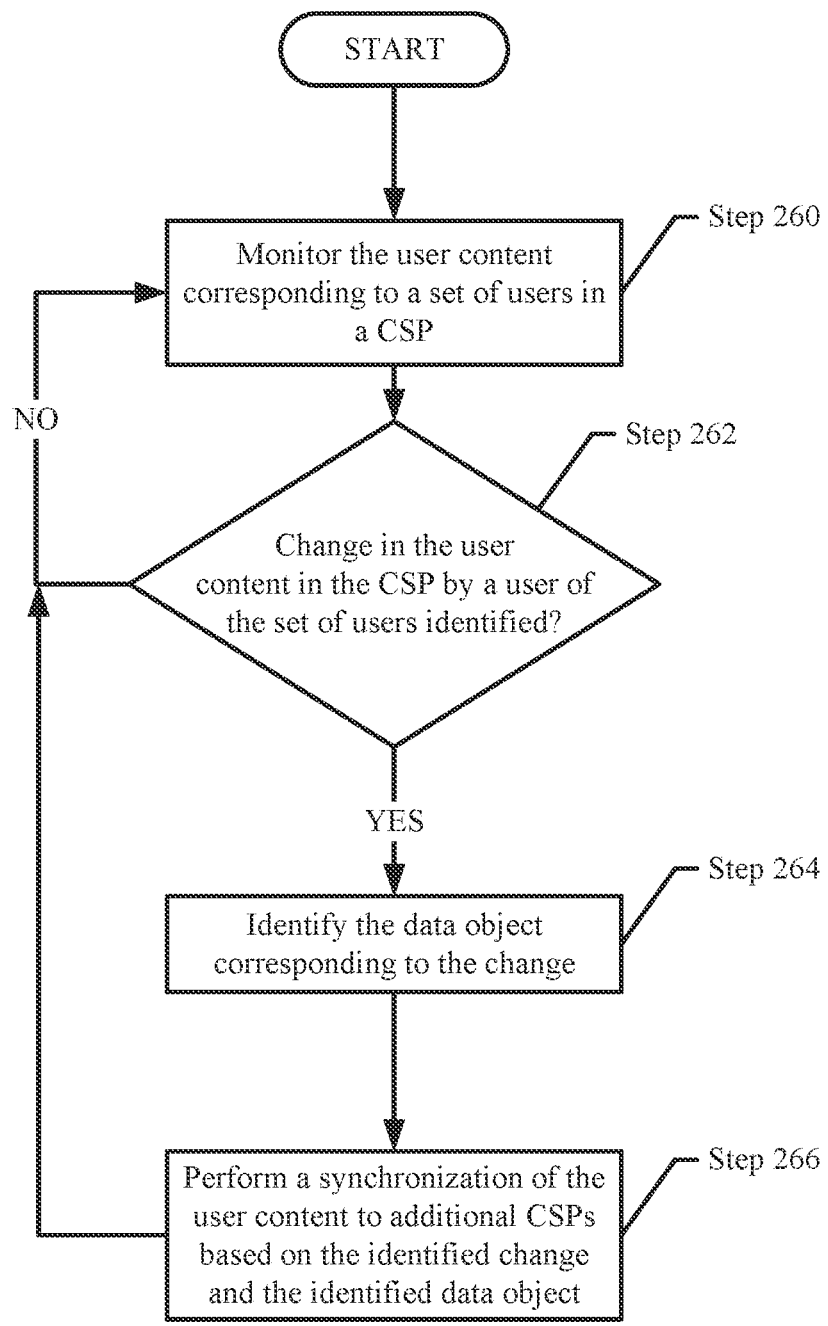
FIG. 2D shows a flowchart for synchronizing user content across CSPs in accordance with one or more embodiments of the invention.
Figure 2E:
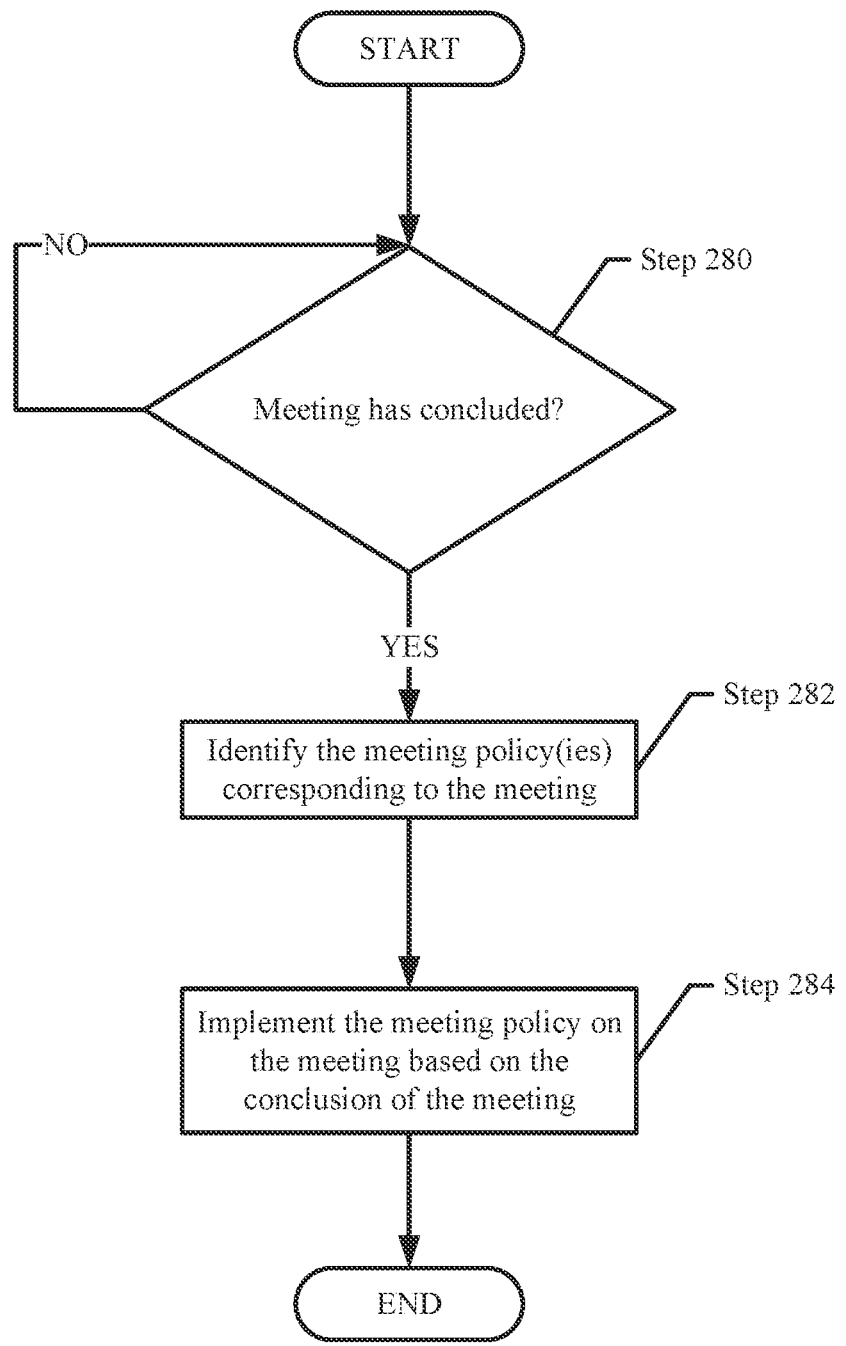
FIG. 2E shows a flowchart for managing meeting conclusions in accordance with one or more embodiments of the invention.

In one or more embodiments of the invention, the CSP management service (104) may perform the aforementioned functionality via the methods illustrated in FIGS. 2C-2E.

In one or more embodiments of the invention, the CSP management service (104) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the CSP management service (104) described throughout this application.

In one or more embodiments of the invention, the CSP management service (104) is implemented as a logical device. The logical device may utilize the computing resources of any number of computing devices and thereby provide the functionality of the CSP management service (104) described throughout this application.

In one or more embodiments of the invention, the client devices (106) are devices operated by users. Each client device (106) may correspond to a user. The client device (106) may initiate preparations for meetings via, for example, the meeting preparation service (108). The client devices (106) may further include functionality for managing the user content based on the provided permissions by the CSP management service (104).

In one or more embodiments of the invention, the meeting preparation service (108) includes functionality for initiating and/or preparing meetings on behalf of the users. For example, the meeting preparation service (108) may store CSP user information (further discussed in FIG. 2A) corresponding to meetings in accordance with the method of FIG. 2A and servicing meeting preparation requests initiated by the client devices in accordance with FIG. 2B. Further, the meeting preparation service (108) includes functionality for providing dashboard-ready information corresponding to the meetings to the client devices. The dashboard-ready information may include, for example, the folder corresponding to the meeting, access links to the user content (with the corresponding permissions), meeting times, updates to meeting configurations, and/or other information without departing from the invention.

In one or more embodiments of the invention, the meeting preparation service (108) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the meeting preparation service (108) described throughout this application.

In one or more embodiments of the invention, the meeting preparation service (108) is implemented as a logical device. The logical device may utilize the computing resources of any number of computing devices and thereby provide the functionality of the meeting preparation service (108) described throughout this application.

While the meeting preparation service (108) is presented as a separate entity from the client devices (106), the meeting preparation service may be implemented as application instances executing on each of the client devices (106). The application instances may each perform the functionality of the meeting preparation service (108) described throughout the application for each user of the corresponding client device.

In one or more embodiments of the invention, the CSP monitoring service (102) includes functionality for obtaining CSP user information from the CSPs (100A, 100B). The CSP monitoring service (102) may monitor the CSPs (100) to obtain login information, user configurations, and/or other CSP user information and provide such information to the meeting preparation service (108). The CSP monitoring service (102) may provide the CSP user information either as requested by the meeting preparation service (108) or as detected by the CSP monitoring service without departing from the invention.

In one or more embodiments of the invention, the CSP monitoring service (102) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the CSP monitoring service (102) described throughout this application.

In one or more embodiments of the invention, the CSP monitoring service (102) is implemented as a logical device. The logical device may utilize the computing resources of any number of computing devices and thereby provide the functionality of the CSP monitoring service (102) described throughout this application.

FIGS. 2A-2E show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2E may be performed in parallel with any other steps shown in FIGS. 2A-2E without departing from the scope of the invention.

FIG. 2A shows a flowchart for obtaining CSP user meeting information in accordance with one or more embodiments of the invention. The method shown in FIG. 2A may be performed by, for example, a meeting preparation service (108, FIG. 1). Other components of the system illustrated in FIG. 1 may perform the method of FIG. 2A without departing from the invention.

Turning to FIG. 2A, in step 200, CSP user information is obtained corresponding to a set of users. In one or more embodiments of the invention, the CSP user information is obtained using a CSP monitoring service that monitors the CSPs for information regarding the set of users subscribed to the meeting preparation service and that have utilized the CSPs to initiate management of meetings. The CSP user information may specify, for example, each user in the set of users, any groups of users formed using, for example, a meeting collaboration tool, configurations for meeting preparations, and/or any meeting policies established for preparing the meetings prior to initiating a preparation of meetings.

In step 202, login information for each user is obtained for each user in the set of users. In one or more embodiments of the invention, the login information is obtained by requesting it from each user. Alternatively, the login information may be obtained from the CSP user information if such login information is included.

In step 204, the obtained CSP user information is stored. The stored CSP user information may include the login information. The CSP user information may be stored in a storage dedicated to the meeting preparation service.

FIG. 2B shows a flowchart for preparing dashboard-ready information to be provided to a subset of users in accordance with one or more embodiments of the invention. The method shown in FIG. 2B may be performed by, for example, a meeting preparation service (108, FIG. 1). Other components of the system illustrated in FIG. 1 may perform the method of FIG. 2B without departing from the invention.

In step 220, a meeting preparation request is obtained for a meeting associated with a subset of users. In one or more embodiments of the invention, the meeting preparation request specifies information corresponding to the meeting. The information may include, for example, a meeting time, the subset of users to be involved in the meeting, the data objects corresponding to the meeting, the permissions to be provided to each user in the subset of users, and/or the meeting policies to be implemented for the meeting. The subset of users may be a portion of the set of users discussed in FIG. 2A.

In step 222, CSP user information associated with the subset of users is identified. In one or more embodiments of the invention, the CSP user information may be identified based on the subset of users. For example, the CSP user information may be labelled based on the corresponding user. The meeting preparation service may identify the CSP user information that is labelled with a user of the subset of users.

In step 224, a content provide request is sent to the CSP management service. In one or more embodiments of the invention, the content provide request specifies preparing the CSPs with the user content corresponding to the meeting for each user. In one or more embodiments of the invention, the content provide request may specify the identified CSP user information.

In one or more embodiments of the invention, the content provide request further specifies obtaining dashboard-ready information that may be used to enable the subset of users to access the user content via the meeting preparation service.

The CSP management service may process the content provide request in accordance with FIG. 2C to provide the dashboard-ready information.

In step 226, dashboard-ready information corresponding to the meeting is obtained. In one or more embodiments of the invention, the dashboard-ready information includes access links to user content corresponding to the meeting. The dashboard-ready information may further include the configurations corresponding to the meeting. The configurations may specify, for example, the meeting time specified in step 200, the permissions provided to each user, and/or the meeting policy (or policies) to be implemented for the meeting.

In step 228, the dashboard-ready information is provided to each user in the subset of users. In one or more embodiments of the invention, the dashboard-ready information is provided to each user via a user interface. The user interface may be, for example, a command line interface (CLI), a graphical user interface (GUI), and/or any other interface without departing from the invention.

In one or more embodiments of the invention, the dashboard-ready information provided to the user is configurable. For example, a user may modify the dashboard-ready information. The meeting preparation service may synchronize the dashboard-ready information displayed to each user. Additionally, the updated dashboard-ready information may be provided to the CSP management service. The CSP management service may manage the CSPs according to the updated dashboard-ready information.

For example, a first user may have the ability to manage the permissions given to each user in the subset of users. The first user may update the permissions specified in the dashboard-ready information. The update to the permissions may be synchronized across the users. Further, the CSP management service may manage the permissions provided to each user such that only the specified users have the ability to access the user content.

FIG. 2C shows a flowchart for managing user content in cloud service providers (CSPs) in accordance with one or more embodiments of the invention. The method shown in FIG. 2C may be performed by, for example, a CSP management service (104, FIG. 1). Other components of the system illustrated in FIG. 1 may perform the method of FIG. 2C without departing from the invention.

In step 240, a content provide request is obtained from the meeting preparation service. The content provide request obtained in step 240 may be the content provide request specified in FIG. 2B. As discussed above, the content provide request specifies CSP user information for a subset of users.

In step 242, access to one or more CSPs is initiated using the CSP user information. In one or more embodiments of the invention, the access is initiated using the CSP user information including the content provide request. The CSP user information may include login information. The login information may be used to perform actions on behalf of the user discussed below. The actions may include, for example, generating the folders corresponding to the meetings in each CSP, generating the user content to be stored in the corresponding folders, and assigning permissions to each data object in the user content.

In step 244, a user policy analysis is performed to determine meeting policies to be implemented for the meeting. In one or more embodiments of the invention, the user policy analysis is performed when the meeting policies are not specified in the content provide request. The user policy analysis includes identifying the user(s) in the subset of users and determining configurations specified by a leading user (e.g., the meeting organizer). The specified configurations may be used to determine the meeting policy for the meeting.

For example, a meeting organizer may configure current and future meetings to delete user content immediately following the conclusion of such meetings. The configuration may be used to determine the current meeting policy as one that specifies deleting a folder with the user content immediately following the conclusion of the meeting.

In step 246, a user content folder is prepared on each CSP corresponding to the meeting. As discussed above, the user content folder may be generated for each CSP specified in the content provide request. The user content folder may include the aforementioned user content, which may include each data object associated with the meeting.

In step 248, access links to each data object of the user content is obtained from the CSPs. In one or more embodiments of the invention, the access links are generated based on the access to the data object. The access links may be a mechanism that enables a user to connect to the CSP to access the corresponding data object. The access links may be implemented as, for example, a hyperlink. The access links may be implemented as other mechanisms without departing from the invention.

In step 250, permissions for each user are determined based on the access links and the meeting policies. In one or more embodiments of the invention, each data object in the user content folder is assigned a permission in accordance with the content provide request. The permissions may be used to determine how each user may access the data objects.

In step 252, dashboard-ready information is provided to the meeting preparation service that includes the access links based on the permissions. Prior to providing the dashboard-ready information, the dashboard-ready information may be prepared such that the meeting preparation service may be enabled to render the dashboard-ready information via the user interface discussed in step 228.

FIG. 2D shows a flowchart for synchronizing user content across CSPs in accordance with one or more embodiments of the invention. The method shown in FIG. 2D may be performed by, for example, a CSP management service (104, FIG. 1). Other components of the system illustrated in FIG. 1 may perform the method of FIG. 2D without departing from the invention.

In step 260, the user content corresponding to a set of users in a CSP is monitored. The user content may be monitored using application programming interfaces (APIs) executing in each CSP that gather information about changes made to the data objects in the user content.

In step 262, a determination is made about whether a change in the user content in the CSP by a user is identified. The change may correspond to a data object in the folder added, deleted, and/or otherwise modified by a user. If a change in the CSP is identified, the method proceeds to step 264; otherwise, the method proceeds to step 260.

Alternatively, the change may be performed locally in the client device. The CSP management device may utilize API commands to determine whether a data object stored locally in the client device corresponds to a user content folder data object in the CSPs. The API commands may further be utilized to determine whether a change to such locally-stored data objects occurs.

In step 264, the data object corresponding to the change is identified. The data object may be identified by identifying the user content folder of the corresponding meeting and identifying the data object in the user content folder.

In step 266, a synchronization of the user content is performed to additional CSPs based on the identified change and the identified data object. In one or more embodiments of the invention, the synchronization includes identifying the additional CSPs in which the user content is to be updated, and performing the change on each of the additional CSPs on behalf of the user.

For example, if the change includes replacing a data object with an updated data object, the synchronization may include replacing each corresponding data object in the additional CSPs with the updated data object on behalf of the user. To perform such synchronization on behalf of the user, the CSP management service may obtain the login information from the meeting preparation service.

FIG. 2E shows a flowchart for managing meeting conclusions in accordance with one or more embodiments of the invention. The method shown in FIG. 2E may be performed by, for example, a CSP management service (104, FIG. 1). Other components of the system illustrated in FIG. 1 may perform the method of FIG. 2E without departing from the invention.

In step 280, a determination is made about whether the meeting has concluded. The determination may be made based on information obtained from the meeting collaboration tool aiding in conducting the meeting. If the meeting has concluded, the method proceeds to step 282; otherwise the method waits and returns to step 280.

In step 282, the meeting policies corresponding to the meeting are identified. In one or more embodiments of the invention, the meeting policies are identified by identifying the meeting and determining which meeting policies correspond to the meeting.

In step 284, the meeting policy is implemented on the meeting based on the conclusion of the meeting. In one or more embodiments of the invention, the meeting policy (or policies) may specify how to execute the conclusion of the meeting. For example, an identified meeting policy may specify one of: (i) deleting the corresponding folder of user content from the CSPs immediately following the conclusion of the meeting, (ii) deleting such folder after a predetermined period of time following such conclusion, or (iii) leaving the folder stored persistently in the CSPs. The meeting policy may further specify what permissions to be provided and/or removed for each of the subset of users associated with the meeting.

In one or more embodiments of the invention, the meeting policy may specify additional services to be provided for the meeting. For example, the meeting policy may specify generating a post-meeting transcript of the meeting in the folder of user content and storing the post-meeting transcript in the corresponding folder of user content.

Example

Figure 3A:
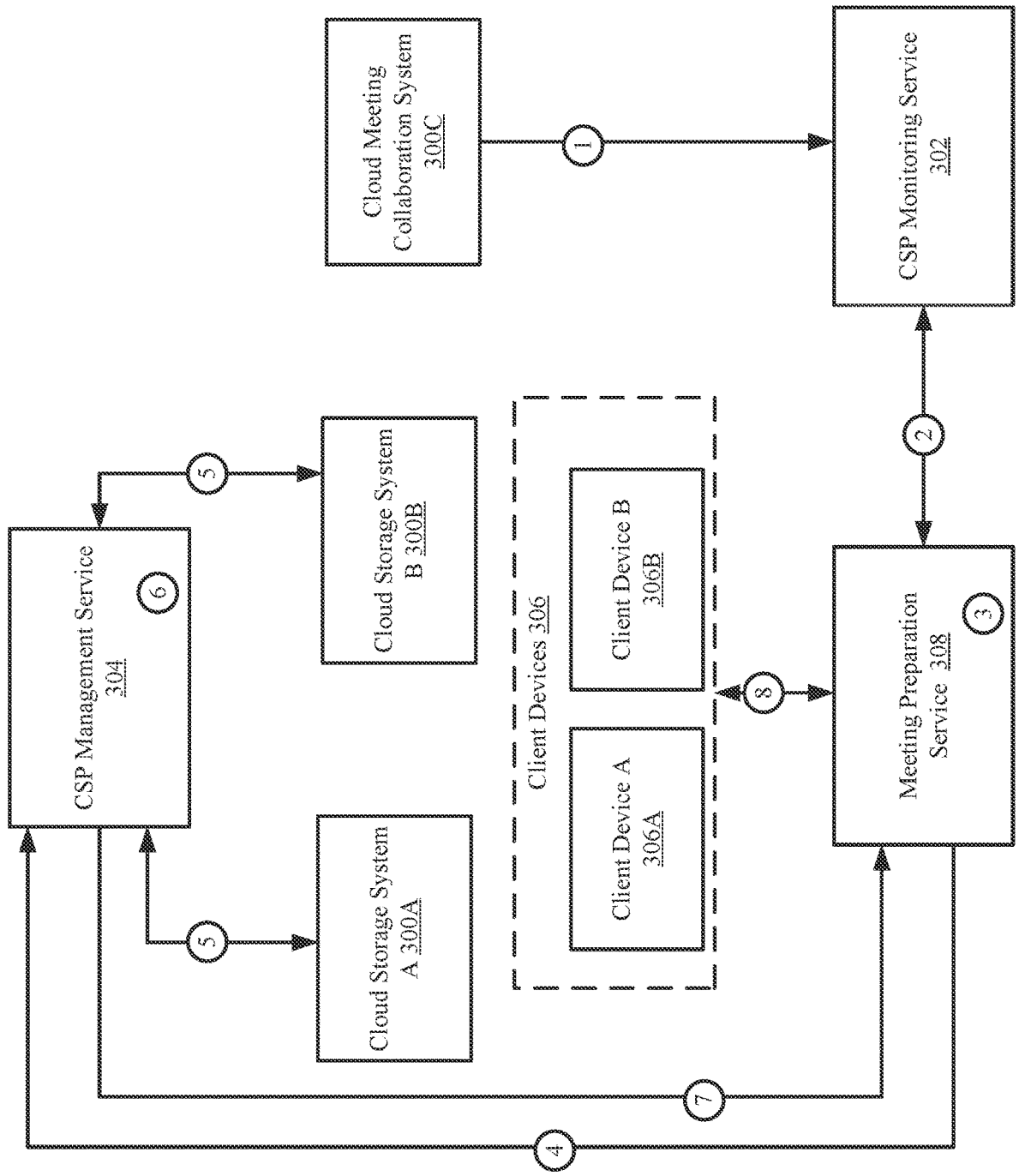
FIGS. 3A-3B show an example in accordance with one or more embodiments of the invention.
Figure 3B:
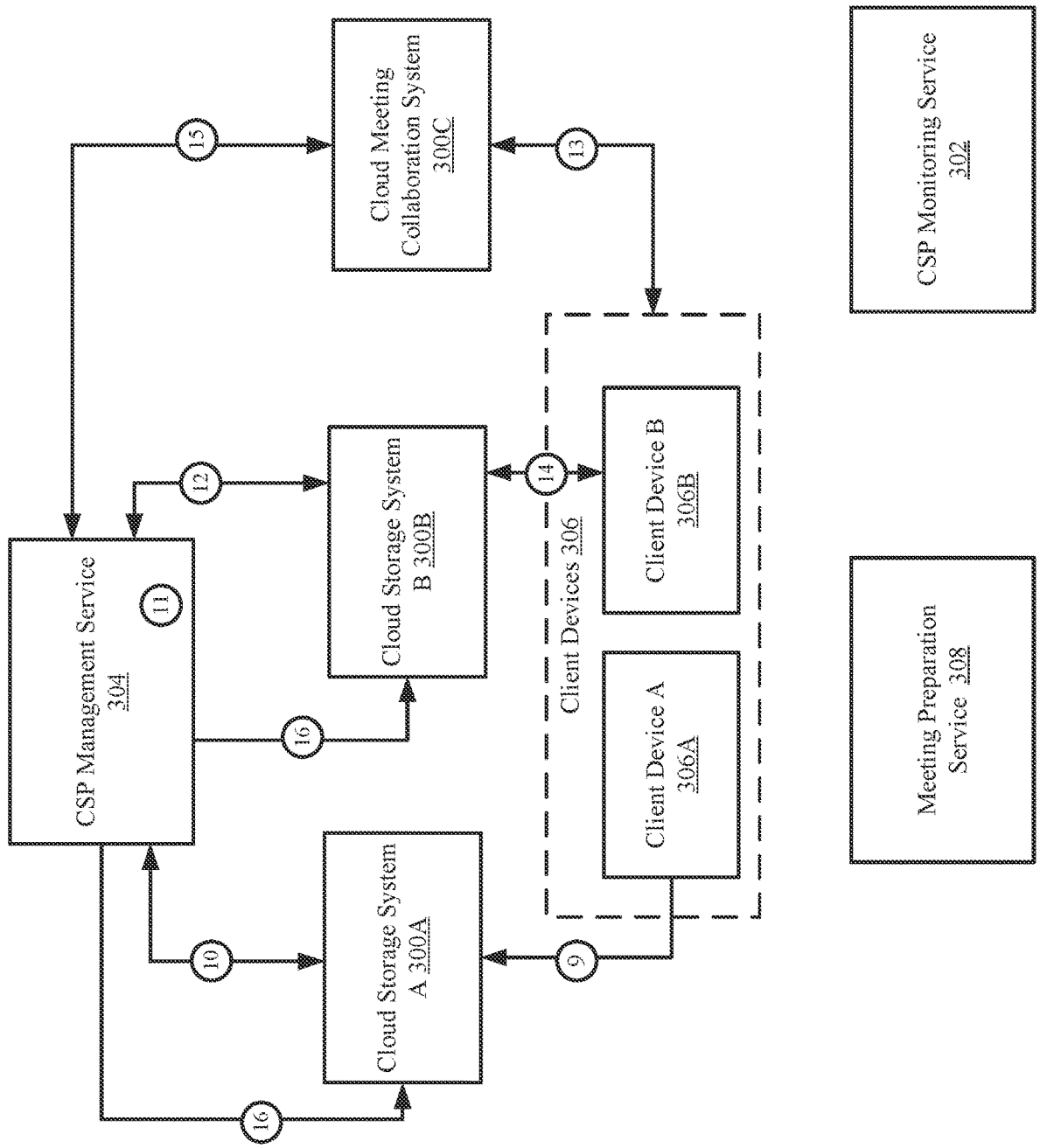

The following section describes an example. The example, illustrated in FIGS. 3A-3B, is not intended to limit the invention. Turning to the example, consider a scenario in which a meeting is to occur between two users subscribed to two independent cloud storage systems (300A, 300B) that manage their data, and a cloud meeting collaboration system (300C) that aids in the execution of the meeting.

FIG. 3A shows a first diagram of an example system. The example system may include the cloud storage systems (300A, 300B), the cloud meeting collaboration system (300C), client devices (306), a CSP management service (304), a meeting preparation service (308), and a CSP monitoring service (302). Each user operates using a client device (e.g., user A operates client device A (306A), and user B operates client device B (306B)).

After each user has subscribed to the cloud meeting collaboration system (300C), and a meeting has been scheduled, the CSP user information is provided to the CSP monitoring service that pulls the information using API commands sent to the cloud meeting collaboration system (300C) [1]. The CSP monitoring service (302) provides the CSP user information to the meeting preparation service (308). The meeting preparation service (308), in response to obtaining the CSP user information, performs the method of FIG. 2B and identifies the CSP user information associated with users A and B, which includes the login information of users A and B [3].

The meeting preparation service (308) sends a content provide request to the CSP management service (304) that specifies preparing a user content folder in each cloud storage system (300A, 300B) and providing access links to the user content in the user content folder [4]. The CSP management service (304), in response to the content provide request, performs the method of FIG. 2C and generates user content folders on each cloud storage system (300A, 300B) [5]. The user content folders include two data objects: (i) a slide show presentation to be managed by user A prior to the meeting and to be presented to user B during the meeting, and (ii) a meeting notes file to be updated by both user A and user B during the meeting.

The CSP management service (304) may further update the permissions for each data object. Specifically, the permissions include allowing user A to read from and write to the slide show presentation prior to the meeting and to allow user B to read from the slide show presentation during the meeting. The permissions further include allowing user A and user B to read the meeting notes prior to the meeting, and to read from and write to the meeting notes during the presentation.

After generating the user content folder and assigning the corresponding permissions, the CSP management service (304) generates the dashboard-ready information that includes generated access links to the user content [6]. The dashboard-ready information is provided to the meeting preparation service (308) [7]. The meeting preparation service (308) may utilize a graphical user interface to display the dashboard-ready information to the client devices (306) [8]. In this manner, the users may access the corresponding user content in accordance with the assigned permissions via the access links included in the dashboard-ready information. Further, the users are enabled to configure any changes to the meeting via the dashboard-ready information.

FIG. 3B shows a second diagram of the example system. At a later point in time, user A updates the slide show presentation. And stores the updated slide show presentation in cloud storage system A (300A) via the provided access link [9]. The CSP management service (304) monitoring cloud storage system A (300A) identifies the change to the data object [10]. The CSP management service (304), following the identification of the change, performs the method of FIG. 2D and identifies that cloud storage system B (300B) stores identical user content corresponding to the slide show presentation [11]. The CSP management service (304) performs a synchronization of the data object on cloud storage system B (300B). This includes storing a copy of the updated slide show presentation on cloud storage system B (300B) [12].

At a later point in time, the client devices (306) utilize the cloud meeting collaboration system (300C) to execute the meeting [13]. The cloud meeting collaboration system (300C) may provide a video chat session accessed by users A and B via the client devices (306). During the execution of the meeting, client device B (306B) accesses the updated slide show presentation using its subscription to cloud storage system B (300B) via the provided access links [14]. During the meeting, client device B (306B) has permission to open the slide show presentation but not modify it. Further, during the meeting, the client devices (306) may update the meeting notes data object. While not shown in FIG. 3B, such updates may be synchronized between the cloud storage systems (300A, 300B).

After the conclusion of the meeting, the CSP management service (304) monitoring the cloud meeting collaboration system (300C) identifies the conclusion of the meeting [15]. In response to the identification of the conclusion, the CSP management service (304) performs the method of FIG. 2E and identifies the meeting policy to be executed. The meeting policy specifies deleting the slide show presentation, generating a post-meeting transcript, and persistently storing the meeting notes in the cloud storage systems (300A, 300B) while leaving read-only permissions for users A and B. The CSP management system implements the meeting policy on the cloud storage systems (300A, 300B) [16].

End of Example

Figure 4:
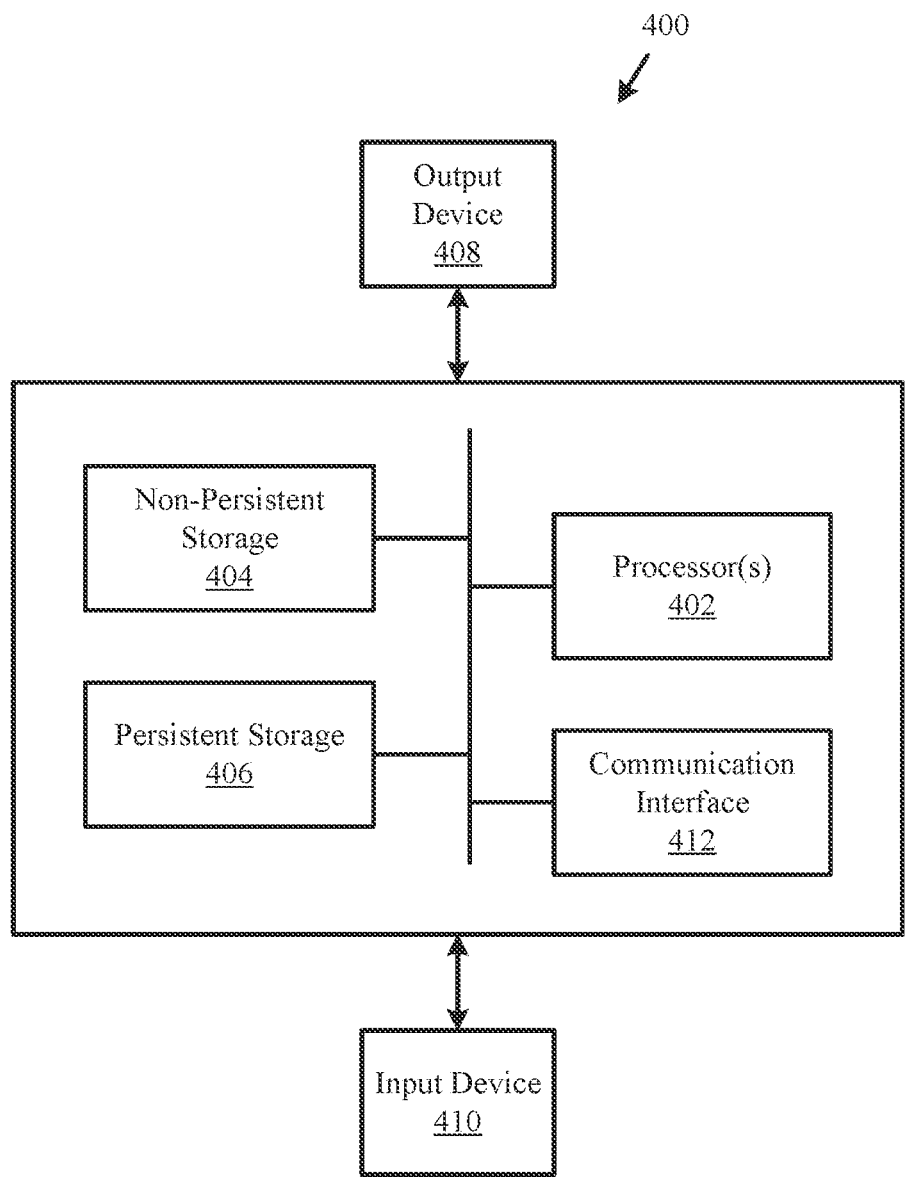
FIG. 4 shows a diagram of a computing device in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing the use of multiple cloud service providers for the execution of meetings. Embodiments of the invention may reduce the cognitive burden of a user for tracking changes performed on user content across multiple cloud service providers by providing access links that abstract the multiple cloud service providers.

Further, embodiments of the invention implement meeting policies that specify permissions to be provided to the users during, before, and after a meeting. The implementation of the policies may reduce the cognitive burden performed on users of managing user content throughout the use of the user content before and during meetings. Further, by implementing policies that may delete user content after a meeting, embodiments of the invention maintain a level of security and privacy of user content by reducing risk of access to data by malicious entities after the desired users no longer need the data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing cloud service providers (CSPs), the method comprising:
   obtaining, by a CSP management service, CSP user information corresponding to a plurality of users;
   initiating access to user content in at least a CSP of the CSPs using the CSP user information;
   after obtaining the CSP user information:
     performing a user policy analysis on the CSP user information to determine a meeting policy;
     obtaining, from a meeting preparation service, a content provide request, wherein the content provide request specifies preparing a user content folder that corresponds to a meeting;
   in response to the content provide request:
     obtaining access links to each data object of the user content that corresponds to the meeting, wherein the access links comprise a first access link to a first data object stored in a first CSP of the CSPs and a second access link to a second data object stored in a second CSP of the CSPs, wherein the user content comprises the first data object and the second data object;

providing dashboard-ready information to the meeting preparation service, wherein the dashboard-ready information comprises the access links;

monitoring, prior to the meeting initiating, the first data object in a first CSP of the CSPs;

making a first determination that a change in the user content in the first CSP occurs;

identifying, using the user content folder, the first data object corresponding to the change; and performing a synchronization to the second data object based on the change and the first data object, wherein the first CSP and the second CSP operate independently of each other;

making a second determination that the meeting has concluded; and implementing, based on the second determination, the meeting policy, wherein the meeting policy specifies modifying access to the access links by the plurality of users after conclusion of the meeting.

2. The method of claim 1, wherein the dashboard-ready information further comprises the meeting policy.

3. The method of claim 1, wherein the dashboard-ready information is displayed to at least a user of the plurality of users by the meeting preparation service.

4. A non-transitory computer readable medium comprising computer readable program code, which when executed by a computer processor enables the computer processor to perform a method for managing CSPs, the method comprising:

obtaining, by a CSP management service, CSP user information corresponding to a plurality of users;

initiating access to user content in at least a CSP of the CSPs using the CSP user information;

after obtaining the CSP user information:
performing a user policy analysis on the CSP user information to determine a meeting policy;
obtaining, from a meeting preparation service, a content provide request, wherein the content provide request specifies preparing a user content folder that corresponds to a meeting;

in response to the content provide request:
obtaining access links to each data object of the user content that corresponds to the meeting, wherein the access links comprise a first access link to a first data object stored in a first CSP of the CSPs and a second access link to a second data object stored in a second CSP of the CSPs, wherein the user content comprises the first data object and the second data object;

providing dashboard-ready information to the meeting preparation service, wherein the dashboard-ready information comprises the access links;

monitoring, prior to the meeting initiating, the first data object in a first CSP of the CSPs;

making a first determination that a change in the user content in the first CSP occurs;

identifying, using the user content folder, the first data object corresponding to the change; and performing a synchronization to the second data object based on the change and the first data object, wherein the first CSP and the second CSP operate independently of each other;

making a second determination that the meeting has concluded; and implementing, based on the second determination, the meeting policy, wherein the meeting policy specifies modifying access to the access links by the plurality of users after conclusion of the meeting.

5. The non-transitory computer readable medium of claim 4, wherein the dashboard-ready information further comprises the meeting policy.

6. The non-transitory computer readable medium of claim 4, wherein the dashboard-ready information is displayed to at least a user of the plurality of users by the meeting preparation service.

7. A system, comprising:
a processor; and
memory comprising instructions which, when executed by the processor, perform a method, the method comprising:

obtaining, by a CSP management service, CSP user information corresponding to a plurality of users;

initiating access to user content in at least a CSP of the CSPs using the CSP user information;

after obtaining the CSP user information:
performing a user policy analysis on the CSP user information to determine a meeting policy;
obtaining, from a meeting preparation service, a content provide request, wherein the content provide request specifies preparing a user content folder that corresponds to a meeting;

in response to the content provide request:
obtaining access links to each data object of the user content that corresponds to the meeting, wherein the access links comprise a first access link to a first data object stored in a first CSP of the CSPs and a second access link to a second data object stored in a second CSP of the CSPs, wherein the user content comprises the first data object and the second data object;

providing dashboard-ready information to the meeting preparation service, wherein the dashboard-ready information comprises the access links;

monitoring, prior to the meeting initiating, the first data object in a first CSP of the CSPs;

making a first determination that a change in the user content in the first CSP occurs;

identifying, using the user content folder, the first data object corresponding to the change; and performing a synchronization to the second data object based on the change and the first data object, wherein the first CSP and the second CSP operate independently of each other;

making a second determination that the meeting has concluded; and implementing, based on the second determination, the meeting policy, wherein the meeting policy specifies modifying access to the access links by the plurality of users after conclusion of the meeting.

\* \* \* \* \*